United States Patent [19]

Strang

[11] 4,367,860

[45] Jan. 11, 1983

[54] HIGH PIVOT TRANSOM BRACKET ASSEMBLY FOR MOUNTING OUTBOARD MOTOR

[75] Inventor: Charles D. Strang, Lake Forest, Ill.

[73] Assignee: Outboard Marine Corporation, Waukegan, Ill.

[21] Appl. No.: 190,589

[22] Filed: Sep. 25, 1980

[51] Int. Cl.³ .......... F16M 13/00

[52] U.S. Cl. .......... 248/641; 248/642

[58] Field of Search .......... 248/641, 642, 643

[56] References Cited

U.S. PATENT DOCUMENTS

| | | | |
|---|---|---|---|
| 2,138,600 | 11/1938 | Harmon . | |
| 2,646,238 | 7/1953 | Kircher et al. | 248/642 |
| 2,713,843 | 7/1955 | Staley . | |
| 2,886,462 | 5/1959 | Jagiel . | |
| 2,911,938 | 11/1959 | Hulsebus | 248/642 X |
| 2,916,009 | 12/1959 | Baird . | |
| 2,928,630 | 3/1960 | Wisman . | |
| 2,928,631 | 3/1960 | Hartman . | |
| 2,939,658 | 6/1960 | Roemer . | |
| 2,954,192 | 9/1960 | Baird . | |
| 3,053,489 | 9/1962 | Robinson et al. | 248/642 |
| 3,075,490 | 1/1963 | Lang . | |
| 3,462,102 | 8/1969 | Rivers | 248/641 |
| 3,486,724 | 12/1969 | Adamski | 248/642 X |
| 4,013,249 | 3/1977 | Meyer . | |

*Primary Examiner*—William H. Schultz
*Attorney, Agent, or Firm*—Michael, Best & Friedrich

[57] ABSTRACT

Disclosed herein is a bracket assembly for supporting an outboard motor from a boat transom so as to permit tilting of the outboard motor substantially wholly in the area aft of the transom, which bracket assembly comprises a transom bracket adapted to be fixed to the boat transom and including an upper end having a bore which is horizontal when the transom bracket is boat mounted, a tilt pin extending in the bore, and a tilt member including an upper end having a bore receiving the tilt member and a lower part including a generally vertically extending outboard motor mounting member located substantially below the tilt pin and substantially rearwardly of the tilt pin.

11 Claims, 4 Drawing Figures

Fig. 1
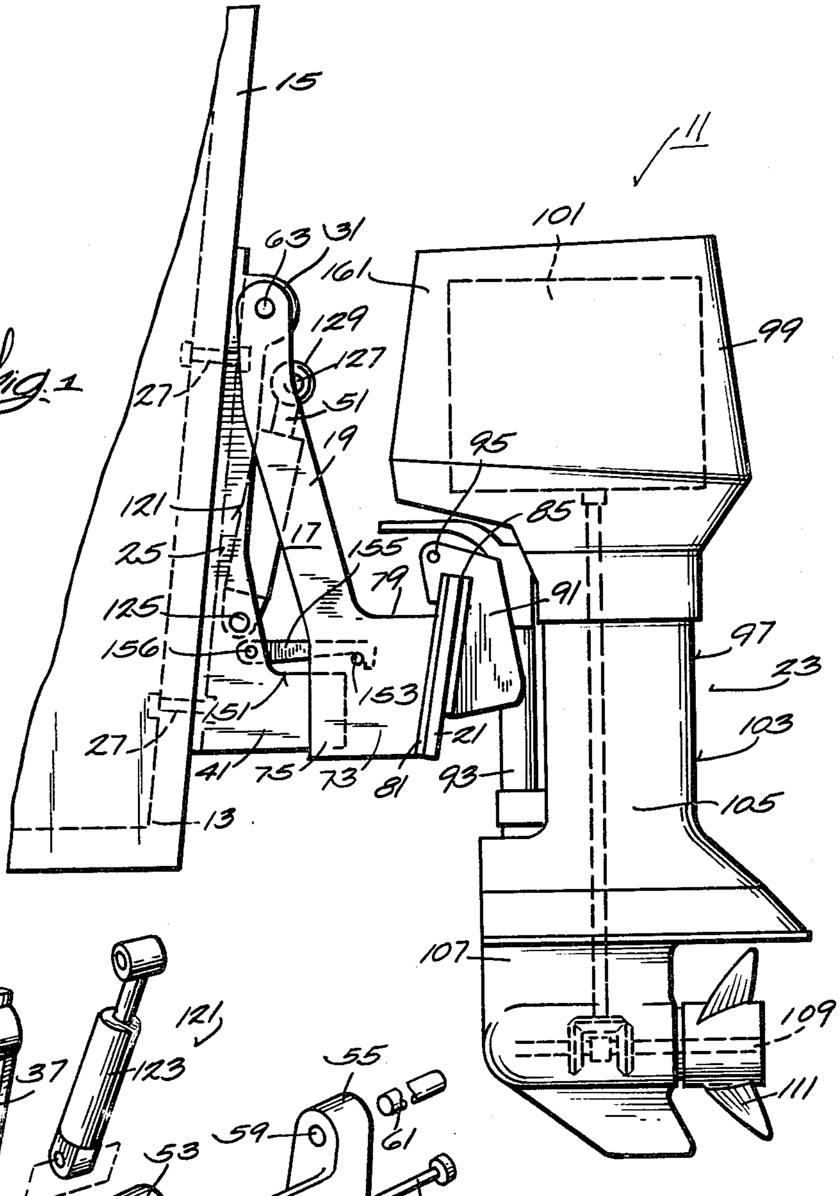
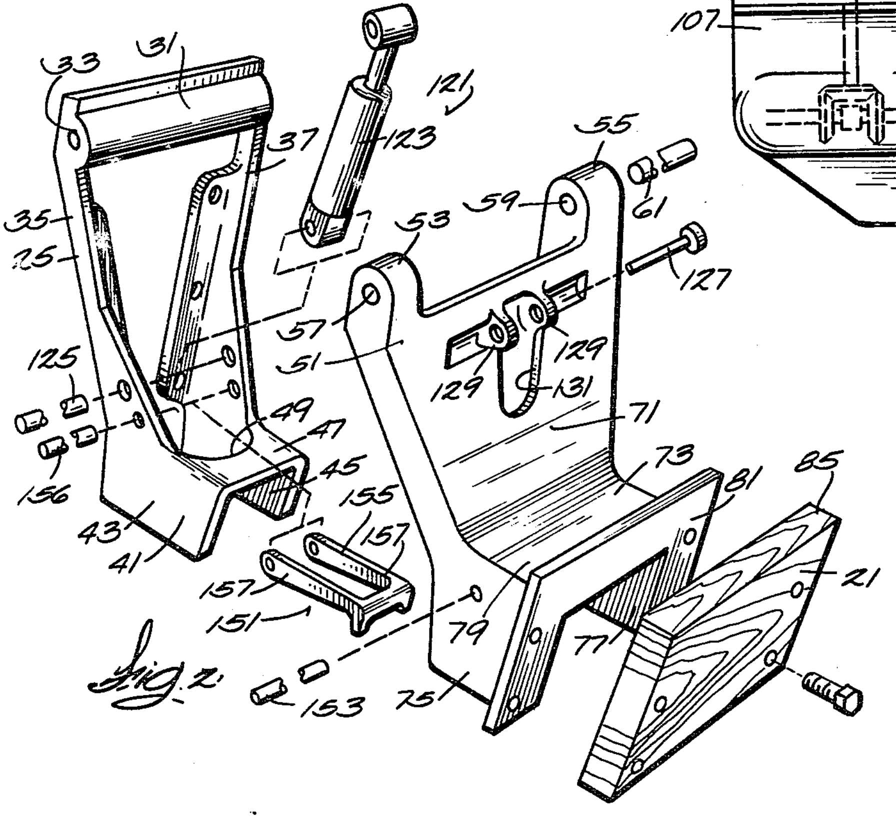
Fig. 2

HIGH PIVOT TRANSOM BRACKET ASSEMBLY FOR MOUNTING OUTBOARD MOTOR

BACKGROUND OF THE INVENTION

The invention relates generally to marine propulsion devices such as outboard motors including a propulsion unit which is both tiltable and steerable relative to a supporting member associated with a boat.

The invention also relates to arrangements for mounting an outboard motor rearwardly of a boat transom so as to permit upward tilting of the outboard motor substantially wholly within the area behind the transom.

Attention is directed to the copending U.S. Stevens Application entitled "Outboard Motor With Elevated Horizontal Pivot Axis", Ser. No. 159,480, filed June 16, 1980 and assigned to the assignee of this application.

The invention disclosed herein is distinguishable from prior bracket assemblies such as is disclosed in the Meyer et al U.S. Pat. No. 4,013,249, issued Mar. 22, 1977, which patent discloses a bracket assembly including a mounting board which forms a part of a four-bar linkage and which is elevated without substantially changing the spacial disposition thereof, i.e., which is elevated without changing its orientation in space.

SUMMARY OF THE INVENTION

The invention provides a bracket assembly for supporting an outboard motor from a boat transom so as to permit tilting of the outboard motor substantially wholly in the area aft of the transom, which bracket assembly comprises a transom bracket adapted to be fixed to the boat transom and including an upper end having a bore which is horizontal when the transom bracket is boat mounted, a tilt pin extending in the bore, and a tilt member including an upper end having a bore receiving the tilt member and a lower part including a generally vertically extending outboard motor mounting member located substantially below the tilt pin and substantially rearwardly of the tilt pin.

In one embodiment of the invention, the transom bracket includes a lower part projecting rearwardly and including spaced vertically extending side walls, and the tilt member lower part has a transverse cross section of inverted U-shape which is adapted to telescope over the rearwardly projecting lower part of the transom bracket and which includes laterally spaced side walls positioned in outwardly adjacent relation to the transom bracket side walls.

In one embodiment of the invention, the assembly further includes an expansible link having first and second ends, together with means pivotally connecting the first end to the lower part of the transom bracket, and means pivotally connecting the second end the to the tilt member rearwardly of and below the tilt pin.

In one embodiment of the invention, the tilt member includes, adjacent the upper end, a vertically extending opening and a rearwardly extending ear, and the second end of the expansible link extends through the opening and is pivotally connected to the ear.

In one embodiment of the invention, the bracket assembly further includes a transverse member extending between the side walls of one of the lower part of the transom bracket and the lower part of the tilt member, a reverse lock having a hook portion adapted to engage the transverse member, and means pivotally connecting the reverse lock to the other one of the lower part of the transom bracket and the lower part of the tilt bracket for movement between a first position engaging the hook portion with the transverse member to prevent upward swinging of the tilt member relative to the transom bracket, and a second position clear of the transverse member and permitting upward swinging of the tilt member relative to the transom bracket, and means for displacing the reverse lock between the first and second positions.

In one embodiment of the invention, the lower part of the tilt member includes an inverted U-shaped section including a horizontal connecting wall and an inverted U-shaped flange projecting vertically from section and the outboard motor mounting member is connected to the flange and extends above the horizontal connecting wall.

In one embodiment of the invention, the bracket assembly further includes an outboard motor connected to the outboard motor mounting member.

The invention also provides a marine propulsion installation comprising a transom bracket adapted to be fixed to the transom of a boat, a tilt bracket including a vertical leg having an upper end and a lower end, and a lower leg extending rearwardly from the lower end of the vertical leg and having an outer rearwardly located mounting board spaced substantially from the lower end of the vertical leg, means on the upper end of the tilt bracket and on the transom bracket rearwardly of the transom for pivotally connecting the swivel bracket and the transom bracket for tilting movement about a tilt axis which is generally horizontal when the transom bracket is fixed to the boat transom and between a normal operating position in which the mounting board is generally vertically extending and a raised tilt position, and a propulsion unit including a powerhead having a forward portion with front and bottom surfaces, and a lower unit secured to the powerhead rearwardly of the bottom surface of the forward portion of the powerhead and including a gearcase carrying a propelling element, and means connecting the propulsion unit to the mounting board with the bottom surface of the forward portion of the powerhead located above the mounting board and with the front surface of the forward portion of the powerhead located forwardly of the mounting board and in rearwardly spaced relation from the vertical leg of the tilt bracket.

In one embodiment in accordance with the invention, the connecting means includes means for pivotally connecting the propulsion unit to the mounting board for steering movement about an axis transverse to the tilt axis.

In one embodiment in accordance with the invention, the connecting means releasably attaches the propulsion unit to the mounting board.

Other features and advantages of the embodiments of the invention will become known by reference to the following general description, claims and appended drawings.

IN THE DRAWINGS

FIG. 1 is a side elevational view of a marine propulsion installation including various of the features of the invention.

FIG. 2 is an exploded perspective view of various of the components of the installation shown in FIG. 1.

Figure 3:
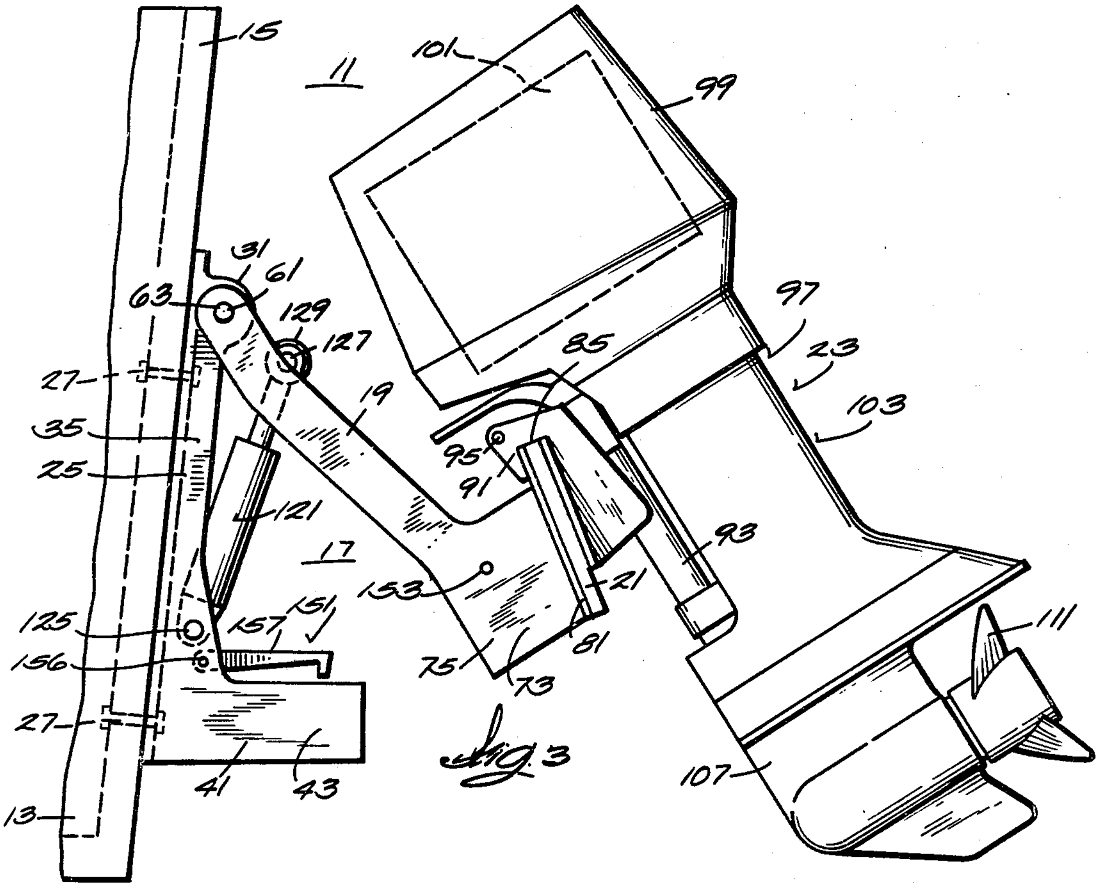
FIG. 3 is an outline view of the marine propulsion installation shown in FIG. 1 with the bracket assembly in tilted position.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a marine propulsion installation 11 which embodies various of the features of the invention and which includes a boat hull 13 having a transom 15, together with a bracket assembly 17 affixed to the rear of the transom 15 and comprising a tilt member or bracket 19 including a mounting board 21, and a conventional outboard motor 23 fixed to the mounting board 21.

The bracket assembly 17 includes, in addition to the tilt bracket 19, a transom bracket 25 which can be integrally constructed or which can constitute several independent parts, and which is suitably attached to the rear of the boat transom 15 as, for instance, by bolts 27.

The transom bracket 25 includes an upper part including a transverse enlargement 31 having therein a transverse bore 33 which is horizontal when the transom bracket 25 is boat mounted.

The transom bracket 25 also incudes two laterally spaced legs 35 and 35, respectively, which extend downwardly from the opposite ends of the enlargement 31 and which, at their lower ends, merge into a lower part 41 which is generally of inverted U-shape. More specifically, the lower part 41 includes, and the legs 35 and 37 merge into, respective side walls 43 and 45 which extend rearwardly from the transom 15 so as to afford receipt of side thrust. The side walls 43 and 45 are connected along the upper margins thereof by a horizontal or top wall 47 which can include a forwardly located cutout or notch 49 facilitating connection to the transom bracket 25 of a tilt mechanism which will be referred to hereinafter.

The tilt bracket 19 includes an upper part or leg 51 including two laterally spaced lugs 53 and 55 which respectively include aligned bores 57 and 59 receiving a tilt pin 61 which also passes through the bore 33 of the enlargement 31, whereby to provide for tilting movement of the tilt bracket 19 relative to the transom bracket 25 about an axis 63 which is located aft of the boat transom 15 and is generally horizontal when the transom bracket 25 is boat mounted. Other arrangements can be employed for tiltably connecting the tilt bracket 19 to the transom bracket 25 about the horizontal axis 63.

The tilt bracket 19 extends downwardly from the lugs 53 and 55 and incudes a central part 71 which extends downwardly and rearwardly from the upper part or leg 51 and which merges into, and forms part of, a rearwardly extending or lower part or leg 73 having a portion which is generally of inverted U-shape including a pair of laterally spaced side walls 75 and 77 and a connecting top wall 79. The lower part 73 is dimensional to be telescoped over the lower part 41 of the transom bracket 25 so as to afford transmission of side thrust from the tilt bracket side walls 75 and 77 to the transom bracket side walls 43 and 45 without adversely affecting tilting movement of the tilt bracket 19 about the horizontal axis 63 and relative to the transom bracket 25.

The rearwardly extending lower part or leg 73 terminates rearwardly in a flange 81 which extends generally vertically from the side and top walls 75, 77, and 79 and which preferably is slightly inclined upwardly and rearwardly when the tilt bracket 19 is in its lowermost position. Fixed on the flange 81 is the before-mentioned mounting board 21 which is generally rectangular, which can be fabricated of wood or of other material, and which has an outer perimeter at least coincident with the outer perimeter of the flange 81. It is to be noted that the top 85 of the mounting board 21 extends above the top wall 79 of the rearwardly extending leg or part 73 of the tilt bracket 19.

Connected to the mounting board 21, as by clamps or bolts, is the outboard motor 23 which is of conventional construction and which includes a mounting bracket 91, a swivel bracket 93 connected to the mounting bracket for pivotal tilting movement about a horizontal axis 95, and a propulsion unit 97 which is connected to the swivel bracket 93 for common tilting movement with the swivel bracket 93 relative to the mounting bracket 91 and for steering movement relative to the swivel bracket 93 about a vertically extending steering axis. The propulsion unit 97 includes both a powerhead 99 including an internal combustion engine 101 and a lower unit 103 including a driveshaft housing 105 which is rigidly secured to the bottom of the powerhead 99 and a gearcase 107 which is rigidly secured to the bottom of the driveshaft housing 105 and which rotationally supports a propeller shaft 109 having affixed thereon a propeller 111.

As earlier referred to, the bracket assembly 17 also includes a tilt mechanism 121 for displacing the tilt bracket 19 about the horizontal axis 63. While various arrangements can be provided, in the illustrated construction, such means comprises an expansible and contractable link 123 which, at one end, is pivotally connected to a strut 125 extending transversely between the transom bracket side walls 43 and 45 and which, at the other end, is pivotally connected to a transverse pin 127 supported by a pair of spaced ears 129 extending rearwardly from the upper part or leg 51 of the tilt member 19.

In the last regard, the tilt member or bracket 19 is formed to incude a slot or aperture 131 to permit rearward passage therethrough of the link 123 and connection to the pin 127. While various expansible and contractable links can be employed, such as, for instance, a pressurized gas filled cylinder-piston assembly which biases the tilt member or bracket 19 pivotally upwardly, in the illustrated construction, the link 123 comprises hydraulic cylinder-piston assembly.

Any suitable arrangement can be employed for providing hydraulic fluid under pressure and for controllably supplying such fluid to the cylinder-piston assembly so as to cause extension and retraction thereof and thereby to tiltably raise or lower the tilt member or bracket 19.

The bracket assembly 17 can also include a reverse lock mechanism 151 for preventing upward swinging of the tilt member or bracket 19 about the horizontal axis 63 in response to reverse operation of the outboard motor 23. While various arrangements can be employed, in the illustrated construction, the reverse lock mechanism 151 comprises a transverse latch bar 153 which is fixed to one of the tilt and transom brackets 19 and 25, together with a reverse lock hook member 155 which is movably carried on the other of the tilt and transom brackets 19 and 25 and which is movable between a locked position engaged with the latch bar 153 to prevent tilting movement of the tilt bracket 19 and a released position disengaged from the latch bar 153 and permitting tilting movement of the tilt member or bracket 19. In the illustrated construction, the hook member 155 is pivotally connected by a pin 156 to the transom bracket 25 adjacent the lower part 41 thereof and the latch bar 153 is fixed on the lower leg or part 73 of the tilt member or bracket 19 between the side walls 75 and 77 and beneath the top wall 79.

The tilt mechanism 121 and reverse lock mechanism 151 can be used alternatively or in combination. In this last regard, when the reverse lock and tilt mechanisms 121 and 151 are used in combination, the hook member 155 preferably includes a pair of laterally spaced legs 157 permitting passage therebetween of the extensible link 123.

Any suitable hydraulic, electrical or mechanical means 159 (shown schematically) can be employed for selectively displacing the hook member 155 between the latch bar engaging or locked position and the disengaged or released position. If both the tilt mechanism 121 and the reverse lock mechanism 151 are employed, means can be provided for automatically displacing the hook member 155 to the disengaged or released position in response to initiation of displacement by the cylinder-piston assembly of the tilt member or bracket 19 from the lowermost or running position.

If the tilt mechanism 121 includes a pressure gas filled cylinder-piston assembly, the reverse lock mechanism 151 can be employed to selectively prevent upward tilting of the tilt member or bracket 19.

Figure 4:
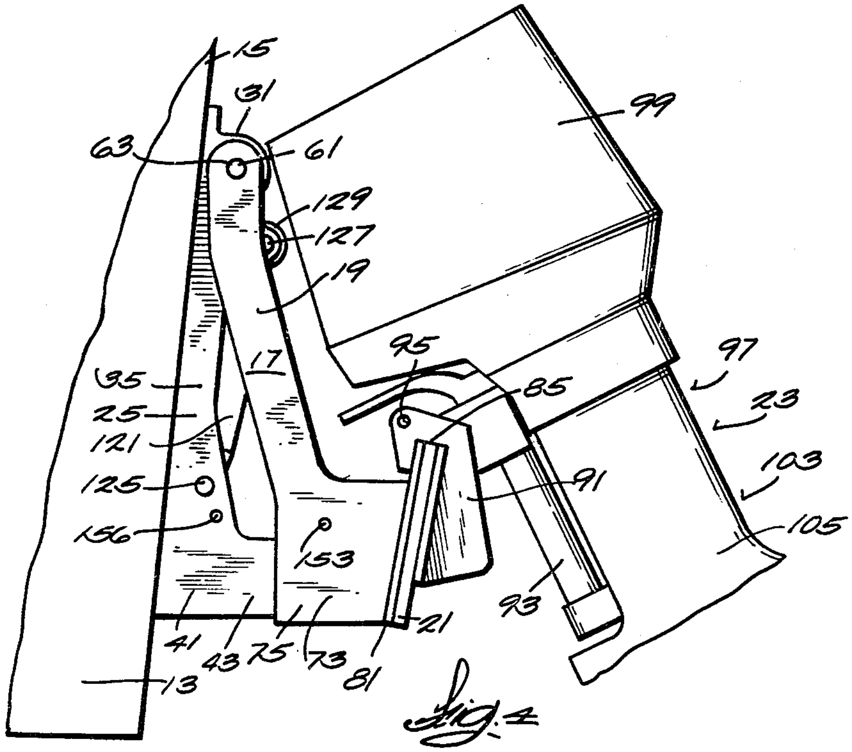
FIG. 4 is a view similar to FIG. 3, showing the propulsion unit of the outboard motor in tilted relation to the bracket assembly.

The upper and lower legs 51 and 73, as well as the central part 71 of the tilt member or bracket 19 are dimensioned so that the mounting board 21 is located with the top 85 thereof spaced substantially below the horizontal tilt axis 63 and substantially rearwardly beyond the transom 15. It is noted that the forward part 161 of the powerhead 99 extends above the top 85 of the mounting board 21 and over the lower leg 73 of the tilt member or bracket 19 and rearwardly of the vertically extending upper leg 51 of the tilt member or bracket 19. The propulsion unit 97 of the outboard member 23 can be tilted about the horizontal axis 95 between the swivel bracket 93 and the mounting bracket 91 into a position shown in FIG. 4 above the top 85 of the mounting board 21 and rearwardly of the tilt member or bracket 19, or alternatively, the propulsion unit 97 can be tilted as shown in FIG. 3, together with the tilt member or bracket 19 about the horizontal axis 63 between the tilt member or bracket 19 and the transom bracket 25 of the bracket assembly 17. In either event, the various components are preferably dimensioned such that upward tilting of the propulsion unit 97 about either of the axis 95 and 63 as shown in FIGS. 3 and 4 does not involve positioning of the powerhead 99 forwardly of the transom. However, at least some of the advantages of the invention can be obtained. When there is some movement of the propulsion unit powerhead 99 forwardly of the top of the boat transom 15.

Various of the features of the invention are set forth in the following claims.

I claim:

1. A bracket assembly for supporting an outboard motor from a boat transom so as to permit tilting of the outboard motor substantially wholly in the area aft of the transom, said bracket assembly comprising a transom bracket adapted to be fixed to the boat transom and including an upper end having a bore which is horizontal when said transom bracket is boat mounted, and a lower part projecting rearwardly and including spaced vertically extending side walls, a tilt pin extending in said bore, and a tilt member including an upper end having a bore receiving said tilt pin, and a lower part having a transverse cross section of U-shape which is adapted to be located in telescopic relation to said rearwardly projecting lower part of said transom bracket and which includes laterally spaced side walls positioned in laterally adjacent relation to said transom bracket side walls and a rearwardly located outer end, and an outboard motor mounting member fixed to said outer end of said lower part, extending generally vertically, and located substantially below said tilt pin and substantially rearwardly of said tilt pin.

2. A bracket assembly in accordance with claim 1 wherein said assembly further includes an expansible link having first and second ends, means pivotally connecting said first end to said lower part of said transom bracket, and means pivotally connecting said second end to said tilt member rearwardly of and below said tilt pin.

3. A bracket assembly in accordance with claim 2 wherein said tilt member includes, adjacent said upper end, a vertically extending opening and a rearwardly extending arm, and wherein said second end of said expansible link extends through said opening and is pivotally connected to said arm.

4. A bracket assembly in accordance with claim 1 and further including a transverse member extending between said side walls of one of said lower part of said transom bracket and said lower part of said tilt member, a reverse lock having a hook portion adapted to engage said transverse member, and means connecting said reverse lock to the other one of said lower part of said transom bracket and said lower part of said tilt bracket for movement between a first position engaging said hook portion with said transverse member to prevent upward swinging of said tilt member relative to said transom bracket, and a second position clear of said transverse member and permitting upward swinging of said tilt member relative to said transom bracket, and means for displacing said reverse lock between said first and second positions.

5. A bracket assembly in accordance with claim 1 wherein said lower part of said tilt member includes an inverted U-shaped section including a horizontal connecting wall and an inverted U-shaped flange projecting vertically from said section, and wherein said outboard motor mounting member is connected to said flange and extends above said horizontal connecting wall.

6. A bracket assembly in accordance with claim 1 and further including an outboard motor connected to said outboard motor mounting member.

7. A bracket assembly in accordance with claim 6 wherein said outboard motor includes a first bracket fixed to said mounting member, a second bracket pivotally connected to said first bracket about a horizontal axis, and a propulsion unit which includes a propeller and which is pivotally connected to said second bracket about a steering axis transverse to said horizontal axis.

8. A bracket assembly for supporting an outboard motor, said bracket assembly comprising a transom bracket adapted to be fixed to the transom of a boat and including an upper end and a lower part projecting rearwardly and including spaced vertically extending side walls, a tilt bracket including a vertical leg having an upper end and a lower end, and a lower leg extending rearwardly from said lower end of said vertical leg and having a transverse cross section of U-shape which is adapted to be located in telescopic relation to said rearwardly projecting lower part of said transom bracket and which includes laterally spaced side walls positioned in laterally adjacent relation to said transom bracket side walls and a rearwardly located outer end, and a mounting board connected to said outer end of said tilt bracket, adapted for connection thereto of an outboard motor, and spaced substantially from said lower end of said vertical leg, and means on said upper ends of said tilt bracket and of said transom bracket rearwardly of the transom for pivotally connecting said tilt bracket and said transom bracket for tilting movement about a tilt axis which is generally horizontal when said transom bracket is fixed to the boat transom and between a normal operating position in which said mounting board is generally vertically extending and a raised tilt position.

9. A marine propulsion installation comprising a transom bracket adapted to be fixed to the transom of a boat and including an upper end and a lower part projecting rearwardly and including spaced vertically extending side walls, a tilt bracket including a vertical leg having an upper end and a lower end, and a lower leg extending rearwardly from said lower end of said vertical leg and having a transverse cross section of U-shape which is adapted to be located in telescopic relation to said rearwardly projecting lower part of said transom bracket and which includes laterally spaced side walls positioned in laterally adjacent relation to said transom bracket side walls and a rearwardly located outer end, a mounting board connected to said outer end of said tilt bracket in substantially spaced relation from said lower end of said vertical leg, means on said upper ends of said tilt bracket and of said transom bracket rearwardly of the transom for pivotally connecting said swivel bracket and said transom bracket for tilting movement about a tilt axis which is generally horizontal when said transom bracket is fixed to the boat transom and between a normal operating position in which said mounting board is generally vertically extending and a raised tilt position, and a propulsion unit including a powerhead having a forward portion with front and bottom surfaces, and a lower unit secured to said powerhead rearwardly of said bottom surface of said forward portion of said powerhead and including a gearcase carrying a propelling element, and means connecting said propulsion unit to said mounting board with said bottom surface of said forward portion of said powerhead located above said mounting board and with said front surface of said forward portion of said powerhead located forwardly of said mounting board and in rearwardly spaced relation from said vertical leg of said tilt bracket.

10. A marine propulsion installation in accordance with claim 9 wherein said connecting means includes means for pivotally connecting said propulsion unit to said mounting board for steering movement about an axis transverse to the tilt axis.

11. A marine propulsion installation in accordance with claim 9 wherein said connecting means releasably attaches said propulsion unit to said mounting board.

* * * * *